United States Patent
Hu et al.

(10) Patent No.: US 11,066,552 B2
(45) Date of Patent: Jul. 20, 2021

(54) RESIN COMPOSITION AND ARTICLE MADE THEREFROM

(71) Applicant: Elite Electronic Material (Zhongshan) Co., Ltd., Zhongshan (CN)

(72) Inventors: Zhilong Hu, Zhongshan (CN); Xiang Xiong, Zhongshan (CN); Yaoqiang Ming, Zhongshan (CN)

(73) Assignee: ELITE ELECTRONIC MATERIAL (ZHONGSHAN) CO., LTD., Zhongshan (CN)

( * ) Notice: Subject to any disclaimer, the term of this patent is extended or adjusted under 35 U.S.C. 154(b) by 124 days.

(21) Appl. No.: 16/699,159

(22) Filed: Nov. 29, 2019

(65) Prior Publication Data
US 2021/0108074 A1  Apr. 15, 2021

(30) Foreign Application Priority Data

Oct. 11, 2019  (CN) .......................... 201910962792.3

(51) Int. Cl.
| | |
|---|---|
| *C08L 71/12* | (2006.01) |
| *C08K 5/54* | (2006.01) |
| *C08K 3/013* | (2018.01) |
| *C08J 5/24* | (2006.01) |
| *C08F 283/08* | (2006.01) |
| *C08G 65/336* | (2006.01) |
| *C08F 283/00* | (2006.01) |
| *C08G 65/48* | (2006.01) |
| *C08L 55/02* | (2006.01) |
| *C08L 25/10* | (2006.01) |

(52) U.S. Cl.
CPC ........ *C08L 71/126* (2013.01); *C08F 283/004* (2013.01); *C08F 283/085* (2013.01); *C08G 65/336* (2013.01); *C08G 65/485* (2013.01); *C08J 5/24* (2013.01); *C08J 5/244* (2021.05); *C08J 5/249* (2021.05); *C08K 3/013* (2018.01); *C08K 5/5403* (2013.01); *C08J 2371/12* (2013.01); *C08J 2409/00* (2013.01); *C08J 2425/10* (2013.01); *C08L 25/10* (2013.01); *C08L 55/02* (2013.01); *C08L 2203/16* (2013.01); *C08L 2203/20* (2013.01); *C08L 2312/08* (2013.01)

(58) Field of Classification Search
CPC ............. C08F 283/085; C08F 283/004; C08G 65/336; C08G 65/485; C08J 5/24; C08J 5/244; C08J 5/249; C08J 2409/00; C08J 2425/10; C08J 2371/12; C08K 5/5403; C08K 3/013; C08L 71/126; C08L 55/02; C08L 2203/16; C08L 2203/20; C08L 25/10; C08L 2312/08
See application file for complete search history.

(56) References Cited

U.S. PATENT DOCUMENTS

| | | | | |
|---|---|---|---|---|
| 2008/0071000 A1* | 3/2008 | Braidwood | ........... | C08L 71/126 521/134 |
| 2015/0152205 A1* | 6/2015 | Kim | ...................... | C08F 212/10 526/279 |

\* cited by examiner

*Primary Examiner* — Patrick D Niland
(74) *Attorney, Agent, or Firm* — Muncy, Geissler, Olds & Lowe, P C.

(57) ABSTRACT

A resin composition includes a vinyl-containing polyphenylene ether resin and a multifunctional vinylsilane. The resin composition may be used to make various articles, such as a prepreg, a resin film, a laminate or a printed circuit board and achieve improvement in at least one of the properties including prepreg or laminate surface appearance, glass transition temperature, ratio of thermal expansion, peel strength, thermal resistance after moisture absorption, thermal resistance, dielectric constant, dissipation factor and inner resin flow.

13 Claims, 1 Drawing Sheet

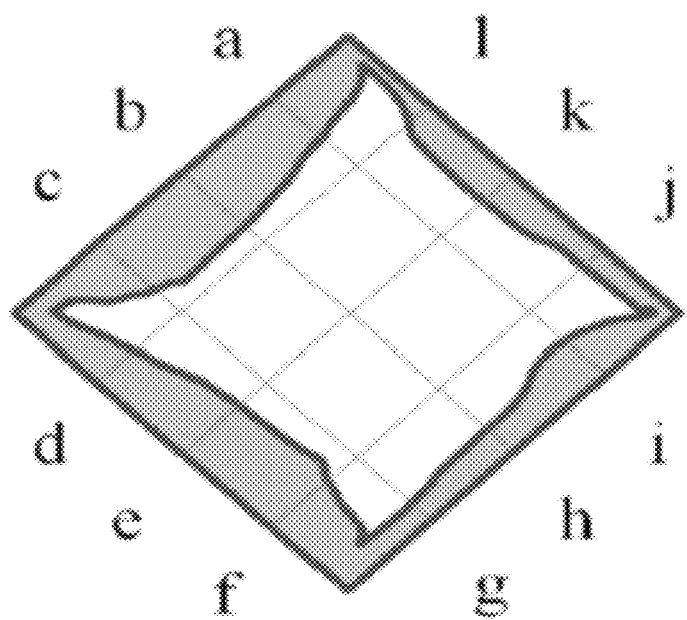

RESIN COMPOSITION AND ARTICLE MADE THEREFROM

CROSS-REFERENCE TO RELATED APPLICATION

This application claims the priority benefits of China Patent Application No. 201910962792.3, filed on Oct. 11, 2019, the entirety of which is hereby incorporated by reference herein and made a part of this specification.

BACKGROUND

1. Field of the Disclosure

The present disclosure mainly relates to a resin composition and more particularly to a resin composition comprising a vinyl-containing polyphenylene ether resin and a multifunctional vinylsilane, which is useful for preparing an article such as a prepreg, a resin film, a laminate or a printed circuit board.

2. Description of Related Art

Low dielectric resin materials are important base materials in the electronic industry and are widely used in various servers, large base stations, cloud equipment and other electronic products.

Recently, the electronic technology has been developed towards high density, lower power consumption and higher performance, thereby presenting more challenges to the high performance electronic materials. Higher interconnection and integration density per unit area of electronic devices results in greater heat generation during the operation of the devices, which requires higher thermal resistance of the low dielectric resin materials including not only glass transition temperature but also thermal delamination resistance and thermal resistance after moisture absorption of the materials. To increase the interconnectivity and installation reliability of the electronic devices, the materials need to achieve lower ratio of thermal expansion to ensure higher dimensional stability which is important to the alignment and positioning during the subsequent printed circuit board processes. In addition, the materials need to have sufficient adhesion strength to ensure strong connection with the metal traces and prevent failure due to separation of the traces. On the other hand, to realize transmission of big data, transmission speed of electronic information needs to be fast, and information transmission needs to be complete without signal loss; therefore, the materials also need to have low dielectric constant and low dissipation factor to meet the demands of growing amount of electronic information data.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

Specifically, the resin composition disclosed herein achieves improvement in one or more of the following properties: prepreg or laminate surface appearance, glass transition temperature, ratio of thermal expansion, peel strength (such as copper foil peeling strength), thermal resistance after moisture absorption, thermal resistance, dielectric constant, dissipation factor and inner resin flow.

To achieve the above-mentioned objects, the present disclosure provides a resin composition, comprising: a vinyl-containing polyphenylene ether resin; and a multifunctional vinylsilane comprising a compound of Formula (I), a compound of Formula (II), or a combination thereof:

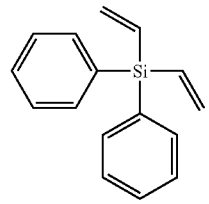

Formula (I)

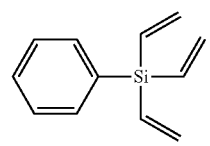

Formula (II)

In one embodiment, the vinyl-containing polyphenylene ether resin comprises a vinylbenzyl-terminated polyphenylene ether resin, a methacrylate-terminated polyphenylene ether resin or a combination thereof.

In one embodiment, the vinylbenzyl-terminated polyphenylene ether resin and the methacrylate-terminated polyphenylene ether resin respectively comprise a structure of Formula (III) and a structure of Formula (IV):

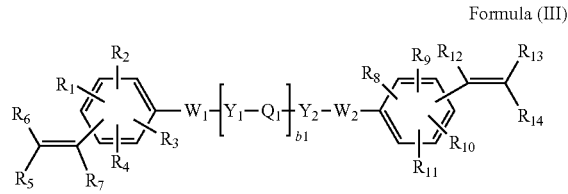

Formula (III)

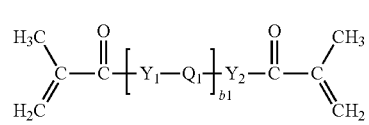

Formula (IV)

wherein $R_1$ to $R_{14}$ are individually H or $-CH_3$, and $W_1$ and $W_2$ are individually a $C_1$ to $C_3$ bivalent aliphatic group;

b1 is a natural number of 0 to 8;

$Q_1$ comprises a structure of any one of Formula (B-1) to Formula (B-3) or a combination thereof:

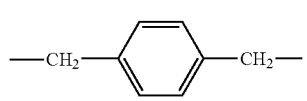

Formula (B-1)

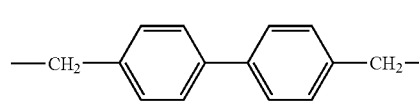

Formula (B-2)

-continued

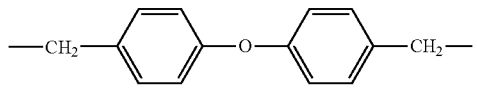

Formula (B-3)

$Y_1$ and $Y_2$ independently comprise a structure of Formula (B-4):

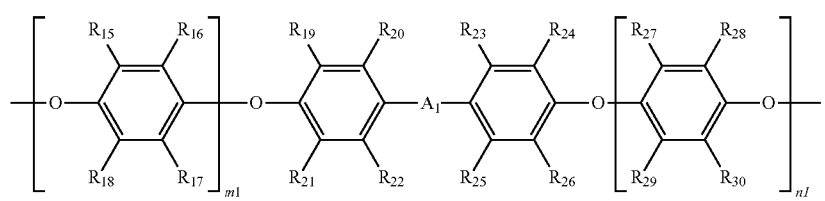

Formula (B-4)

wherein $R_{15}$ to $R_{30}$ are independently H or —$CH_3$; m1 and n1 independently represent an integer of 1 to 30; and $A_1$ is selected from a covalent bond, —$CH_2$—, —$CH(CH_3)$—, —$C(CH_3)_2$—, —O—, —S—, —$SO_2$— and a carbonyl group.

In one embodiment, the resin composition disclosed herein may further optionally comprise: a cyanate ester resin, a polyolefin resin, a small molecule vinyl compound, an acrylate resin, an epoxy resin, a phenolic resin, a benzoxazine resin, a styrene maleic anhydride resin, a polyester resin, an amine curing agent, a polyamide resin, a polyimide resin or a combination thereof.

In one embodiment, the resin composition disclosed herein may further optionally comprise flame retardant, inorganic filler, curing accelerator, solvent, toughening agent, silane coupling agent or a combination thereof.

In one embodiment, the resin composition comprises 5 to 140 parts by weight of the multifunctional vinylsilane relative to 100 parts by weight of the vinyl-containing polyphenylene ether resin.

In one embodiment, the resin composition comprises 20 to 100 parts by weight of the multifunctional vinylsilane relative to 100 parts by weight of the vinyl-containing polyphenylene ether resin.

In one embodiment, the resin composition comprises 5 to 30 parts by weight of the polyolefin resin relative to 100 parts by weight of the vinyl-containing polyphenylene ether resin.

Another main object of the present disclosure is to provide an article made from the aforesaid resin composition, comprising a prepreg, a resin film, a laminate or a printed circuit board.

In one embodiment, articles made from the resin composition disclosed herein have one, more or all of the following properties:
- normal prepreg or laminate surface appearance, such as no oily precipitation or stickiness on the prepreg surface or no void or branch-like pattern on the insulation layer surface of a copper-free laminate;
- high glass transition temperature as measured by reference to IPC-TM-650 2.4.24.4, such as the first glass transition temperature Tg1 being greater than or equal to 181° C., such as between 181° C. and 202° C., the second glass transition temperature Tg2 being greater than or equal to 197° C., such as between 197° C. and 217° C., or such as the first glass transition temperature Tg1 being greater than or equal to 192° C., such as between 192° C. and 202° C., and the second glass transition temperature Tg2 being greater than or equal to 208° C., such as between 208° C. and 217° C.;
- a ratio of thermal expansion as measured by reference to IPC-TM-650 2.4.24.5 of less than or equal to 2.60%, such as less than or equal to 2.30%, or such as between 1.90% and 2.60% or between 2.10% and 2.30%;
- a copper foil peeling strength as measured by reference to IPC-TM-650 2.4.8 of greater than or equal to 2.3 lb/in, such as greater than or equal to 2.9 lb/in, such as between 2.3 lb/in and 3.4 lb/in or between 2.9 lb/in and 3.4 lb/in;
- no delamination after subjecting the article to a thermal resistance test after moisture absorption by reference to IPC-TM-650 2.6.16.1 and IPC-TM-650 2.4.23;
- a time to delamination as measured by using a thermomechanical analyzer by reference to IPC-TM-650 2.4.24.1 of greater than or equal to 70 minutes;
- a dielectric constant as measured by reference to JIS C2565 at 10 GHz of less than or equal to 3.35, such as less than or equal to 3.30, or such as between 3.20 and 3.35 or between 3.20 and 3.30;
- a dissipation factor as measured by reference to JIS C2565 at 10 GHz of less than or equal to 0.0036, such as less than or equal to 0.0033, or such as between 0.0030 and 0.0036 or between 0.0030 and 0.0033; and
- an inner resin flow of between 5 mm and 40 mm, such as between 10 mm and 30 mm.

BRIEF DESCRIPTION OF THE DRAWINGS

The sole FIGURE illustrates measurement points of a sample for inner resin flow test.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Similarly, a range of "between 1 and 8" should be understood as explicitly disclosing all ranges such as 1 to 8, 1 to 7, 2 to 8, 2 to 6, 3 to 6, 4 to 8, 3 to 8 and so on and encompassing the end points of the ranges. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure includes any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Unless otherwise specified, according to the present disclosure, a resin may include a compound and/or a mixture. A compound may include a monomer and/or a polymer. A mixture may include two or more compounds and may include a copolymer or auxiliaries, but not limited thereto.

For example, a compound refers to a chemical substance formed by two or more elements bonded with chemical bonds and may be present as a monomer, a polymer, etc., but not limited thereto. A monomer refers to a compound which may participate in a polymerization or prepolymerization reaction to produce a high molecular weight compound. A homopolymer refers to a chemical substance formed by a single compound via polymerization, addition polymerization or condensation polymerization, and a copolymer refers to a chemical substance formed by two or more compounds via polymerization, addition polymerization or condensation polymerization, but not limited thereto. In addition, as used herein, the term "polymer" includes but is not limited to an oligomer. An oligomer refers to a polymer with 2 to 20, typically 2 to 5, repeating units.

As described above, the present disclosure primarily aims to provide a resin composition, comprising: a vinyl-containing polyphenylene ether resin; and a multifunctional vinylsilane comprising a compound of Formula (I), a compound of Formula (II), or a combination thereof:

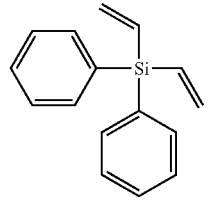

Formula (I)

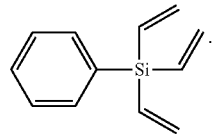

Formula (II)

For example, the multifunctional vinylsilane (a.k.a. multifunctional vinylsilane resin) used herein may be available from Suzhou Siso New Material Co., Ltd., such as but not limited to the multifunctional vinylsilane of CAS No. 17937-68-7 or 18042-57-4.

Unless otherwise specified, the multifunctional vinylsilane used herein contains at least two reactive carbon-carbon double bounds (C=C), such as two or three. In addition, unless otherwise specified, the multifunctional vinylsilane used herein does not contain and excludes a compound having only one reactive carbon-carbon double bound and does not contain and excludes a siloxane having a silicon-oxygen-silicon backbone structure.

For example, according to the present disclosure, the vinyl-containing polyphenylene ether resin refers to a polyphenylene ether compound or mixture having an ethylenic carbon-carbon double bond (C=C) or a functional group derived therefrom, examples thereof including but not limited to the presence of a vinyl group, an allyl group, a vinylbenzyl group, a methacrylate group or the like in its structure. Unless otherwise specified, the position of the aforesaid functional group is not particularly limited and may be located at the terminal of a long-chain structure. In other words, the vinyl-containing polyphenylene ether resin described herein represents a polyphenylene ether resin containing a reactive vinyl group or a functional group derived therefrom, examples including but not limited to a polyphenylene ether resin containing a vinyl group, an allyl group, a vinylbenzyl group, or a methacrylate group.

In one embodiment, the vinyl-containing polyphenylene ether resin described herein comprises a vinylbenzyl-terminated polyphenylene ether resin, a methacrylate-terminated polyphenylene ether resin or a combination thereof.

For example, the vinylbenzyl-terminated polyphenylene ether resin refers to a polyphenylene ether resin with its terminal positions bonded to a vinylbenzyl group as shown below via an ether linkage.

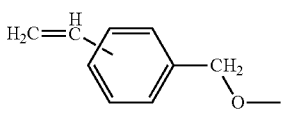

For example, the methacrylate-terminated polyphenylene ether resin refers to a polyphenylene ether resin with its terminals bonded to a methacrylate group.

In one embodiment, the vinylbenzyl-terminated polyphenylene ether resin and the methacrylate-terminated polyphenylene ether resin described above respectively comprise a structure of Formula (III) and a structure of Formula (IV):

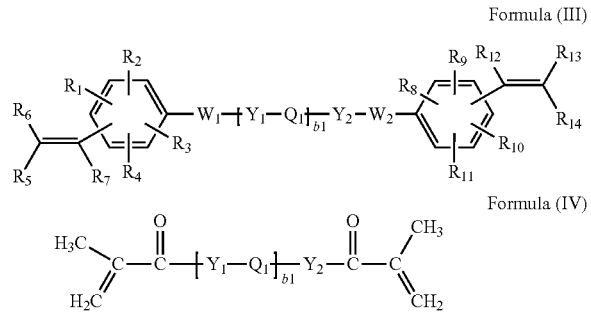

wherein $R_1$ to $R_{14}$ are individually H or $-CH_3$, and $W_1$ and $W_2$ are individually a $C_1$ to $C_3$ bivalent aliphatic group (e.g., methylene, ethylene, or propylene);
b1 is a natural number of 0 to 8;
$Q_1$ comprises a structure of any one of Formula (B-1) to Formula (B-3) or a combination thereof:

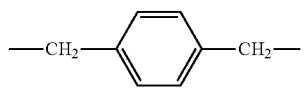

Formula (B-1)

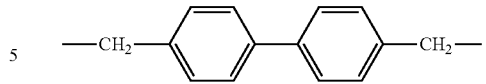

Formula (B-2)

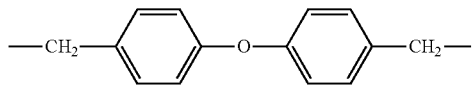

Formula (B-3)

$Y_1$ and $Y_2$ independently comprise a structure of Formula (B-4):

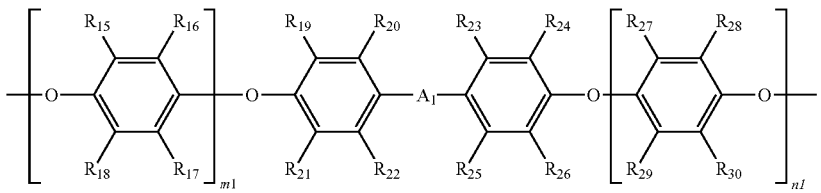

Formula (B-4)

wherein $R_{15}$ to $R_{30}$ are independently H or $-CH_3$; m1 and n1 independently represent an integer of 1 to 30, such as 1, 5, 10, 15, 20, 25 or 30; and $A_1$ is selected from a covalent bond, $-CH_2-$, $-CH(CH_3)-$, $-C(CH_3)_2-$, $-O-$, $-S-$, $-SO_2-$ and a carbonyl group.

In one embodiment, the aforesaid methacrylate-terminated polyphenylene ether resin is SA-9000 available from Sabic.

In one embodiment, the aforesaid vinylbenzyl-terminated polyphenylene ether resin is OPE-2st available from Mitsubishi Gas Chemical Co., Inc.

According to the present disclosure, unless otherwise specified, the amount or ratio of the vinyl-containing polyphenylene ether resin and the multifunctional vinylsilane in the resin composition is not particularly limited. In other words, the relative content of the vinyl-containing polyphenylene ether resin and the multifunctional vinylsilane may be changed or adjusted if needed.

In one embodiment, the resin composition disclosed herein may comprise 100 parts by weight of the vinyl-containing polyphenylene ether resin and 5 to 140 parts by weight of the multifunctional vinylsilane.

In another embodiment, the resin composition disclosed herein may comprise 100 parts by weight of the vinyl-containing polyphenylene ether resin and 20 to 100 parts by weight of the multifunctional vinylsilane.

In one embodiment, in addition to the vinyl-containing polyphenylene ether resin and the multifunctional vinylsilane, the resin composition disclosed herein may further optionally comprise: a cyanate ester resin, a polyolefin resin, a small molecule vinyl compound, an acrylate resin, an epoxy resin, a phenolic resin, a benzoxazine resin, a styrene maleic anhydride resin, a polyester resin, an amine curing agent, a polyamide resin, a polyimide resin or a combination thereof.

For example, the cyanate ester resin used herein may include any known cyanate ester resins used in the art, including but not limited to a cyanate ester resin with an Ar—O—C≡N structure (wherein Ar represents an aromatic group, such as benzene, naphthalene or anthracene), a phenol novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, a phenolphthalein cyanate ester resin, or a combination thereof. Examples of the cyanate ester resin include but are not limited to Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy available from Lonza.

For example, the polyolefin resin used herein may include any one or more polyolefin resins useful for preparing a prepreg, a resin film, a laminate or a printed circuit board. Examples include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, methylstyrene homopolymer, petroleum resin, cycloolefin copolymer and a combination thereof. In one embodiment, the resin composition comprises 5 to 30 parts by weight of the polyolefin resin relative to 100 parts by weight of the vinyl-containing polyphenylene ether resin.

For example, the small molecule vinyl compound as used herein refers to a vinyl-containing compound with a molecular weight of less than or equal to 1000, preferably between 100 and 900 and more preferably between 100 and 800. In one embodiment, the small molecule vinyl compound may include, but not limited to, divinylbenzene (DVB), bis(vinylbenzyl) ether (BVBE), bis(vinylphenyl)ethane (BVPE), triallyl isocyanurate (TAIC), triallyl cyanurate (TAC), 1,2,4-trivinyl cyclohexane (TVCH) or a combination thereof.

For example, the acrylate resin as used herein may include, but not limited to, tricyclodecane di(meth)acrylate, tri(meth)acrylate, 1,1'-[(octahydro-4,7-methano-1H-indene-5,6-diyl)bis(methylene)]ester (e.g., SR833S, available from Sartomer) or a combination thereof.

For example, the epoxy resin as used herein may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin, wherein the phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the phenolic resin used herein may be a mono-functional, bifunctional or multi-functional phenolic resin. The type of the phenolic resin is not particularly limited and may include those currently used in the field to which this disclosure pertains. Preferably, the phenolic resin is selected from a phenoxy resin, a novolac resin or a combination thereof.

For example, the benzoxazine resin used herein may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, the styrene maleic anhydride resin used herein may have a ratio of styrene (S) to maleic anhydride (MA) of 1:1, 2:1, 3:1, 4:1, 6:1, or 8:1, examples including but not limited to styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 available from Cray Valley. Unless otherwise specified, the styrene maleic anhydride resin can be added individually or as a combination to the resin composition of this disclosure.

For example, the polyester resin used herein may be obtained by esterification of an aromatic compound with two carboxylic groups and an aromatic compound with two hydroxyl groups, such as but not limited to HPC-8000, HPC-8150 or HPC-8200 available from DIC Corporation.

For example, the amine curing agent used herein may be dicyandiamide, diamino diphenyl sulfone, diamino diphenyl methane, diamino diphenyl ether, diamino diphenyl sulfide or a combination thereof, but not limited thereto.

For example, the polyamide resin used herein may be any polyamide resin known in the field to which this disclosure pertains, including but not limited to various commercially available polyamide resin products.

For example, the polyimide resin used herein may be any polyimide resin known in the field to which this disclosure pertains, including but not limited to various commercially available polyimide resin products.

In one embodiment, in addition to the vinyl-containing polyphenylene ether resin and the multifunctional vinylsilane, the resin composition disclosed herein may optionally further comprise flame retardant, inorganic filler, curing accelerator, solvent, toughening agent, silane coupling agent or a combination thereof.

In one embodiment, for example, the flame retardant used herein may be any one or more flame retardants useful for preparing a prepreg, a resin film, a laminate or a printed circuit board; examples of flame retardant include but are not limited to phosphorus-containing flame retardant, such as any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, diphenylphosphine oxide (DPPO) and its derivatives or resins, melamine cyanurate, tri-hydroxy ethyl isocyanurate, aluminium phosphinate (e.g., commercially available OP-930 and OP-935), or a combination thereof.

For example, the flame retardant used herein may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, etc., wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac), etc.

In one embodiment, for example, the inorganic filler used herein may be any one or more inorganic fillers used for preparing a resin film, a prepreg, a laminate or a printed circuit board; examples include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, and calcined kaolin. Moreover, the inorganic filler can be spherical, fibrous, plate-like, particulate, sheet-like or whisker-like and can be optionally pretreated by a silane coupling agent.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

In one embodiment, for example, the purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

In one embodiment, for example, the purpose of adding toughening agent is to improve the toughness of the resin composition. The toughening agent may comprise, but not limited to, carboxyl-terminated butadiene acrylonitrile rubber (CTBN rubber), core-shell rubber, or a combination thereof.

In one embodiment, for example, the silane coupling agent used herein may comprise silane (such as but not limited to siloxane) and may be further categorized according to the functional groups into amino silane compound, epoxide silane compound, vinylsilane compound, acrylate silane compound, methacrylate silane compound, hydroxylsilane compound, isocyanate silane compound, methacryloxy silane compound and acryloxy silane compound.

The resin composition of various embodiments may be processed to make different articles, such as those suitable for use as components in electronic products, including but not limited to a prepreg, a resin film, a laminate or a printed circuit board.

For example, the resin composition from each embodiment of this disclosure can be used to make a prepreg, which comprises a reinforcement material and a layered structure disposed thereon. The layered structure is formed by heating the resin composition at a high temperature to the semi-cured state (B-stage). Suitable baking temperature for making the prepreg may be for example 80° C. to 200° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

For example, the resin composition from each embodiment of this disclosure can be used to make a resin film, which is prepared by heating and baking to semi-cure the resin composition. The resin composition may be selectively coated on a polyethylene terephthalate film (PET film), a polyimide film (PI film), a copper foil or a resin-coated copper, followed by heating and baking to semi-cure the resin composition to form the resin film.

For example, the resin composition from each embodiment of this disclosure can be used to make a laminate, which comprises two metal foils and an insulation layer disposed between the metal foils, wherein the insulation layer is made by curing the resin composition at high temperature and high pressure to the C-stage, a suitable curing temperature being for example between 150° C. and 220° C. and preferably between 200° C. and 210° C. and a suitable curing time being 90 to 180 minutes and preferably 120 to 150 minutes. The insulation layer may be formed by curing the aforesaid prepreg or resin film to the C-stage. The metal foil may comprise copper, aluminum, nickel, platinum, silver, gold or alloy thereof, such as a copper foil.

Preferably, the laminate is a copper-clad laminate (CCL).

In addition, the laminate may be further processed by trace formation processes to provide a circuit board, such as a printed circuit board.

Preferably, the resin composition of the present disclosure or the article made therefrom may achieve improvement in one or more of the following properties: prepreg or laminate surface appearance, glass transition temperature, ratio of thermal expansion, peel strength, thermal resistance after moisture absorption, thermal resistance, dielectric constant, dissipation factor and inner resin flow.

For example, the resin composition according to the present disclosure or the article made therefrom may achieve one, more or all of the following properties:

normal prepreg or laminate surface appearance, such as no oily precipitation or stickiness on the prepreg surface or no void or branch-like pattern on the insulation layer surface of a copper-free laminate;

high glass transition temperature as measured by reference to IPC-TM-650 2.4.24.4, such as the first glass transition temperature Tg1 being greater than or equal to 181° C., such as between 181° C. and 202° C., the second glass transition temperature Tg2 being greater than or equal to 197° C., such as between 197° C. and 217° C., or such as the first glass transition temperature Tg1 being greater than or equal to 192° C., such as between 192° C. and 202° C., and the second glass transition temperature Tg2 being greater than or equal to 208° C., such as between 208° C. and 217° C.;

a ratio of thermal expansion as measured by reference to IPC-TM-650 2.4.24.5 of less than or equal to 2.60%, such as less than or equal to 2.30%, or such as between 1.90% and 2.60% or between 2.10% and 2.30%;

a copper foil peeling strength as measured by reference to IPC-TM-650 2.4.8 of greater than or equal to 2.3 lb/in, such as greater than or equal to 2.9 lb/in, such as between 2.3 lb/in and 3.4 lb/in or between 2.9 lb/in and 3.4 lb/in;

no delamination after subjecting the article to a thermal resistance test after moisture absorption by reference to IPC-TM-650 2.6.16.1 and IPC-TM-650 2.4.23;

a time to delamination as measured by using a thermomechanical analyzer by reference to IPC-TM-650 2.4.24.1 of greater than or equal to 70 minutes;

a dielectric constant as measured by reference to JIS C2565 at 10 GHz of less than or equal to 3.35, such as less than or equal to 3.30, or such as between 3.20 and 3.35 or between 3.20 and 3.30;

a dissipation factor as measured by reference to JIS C2565 at 10 GHz of less than or equal to 0.0036, such as less than or equal to 0.0033, or such as between 0.0030 and 0.0036 or between 0.0030 and 0.0033; and an inner resin flow of between 5 mm and 40 mm, such as between 10 mm and 30 mm.

Raw materials below were used to prepare the resin compositions of various Examples and Comparative Examples of the present disclosure according to the amount listed in Table 1 to Table 3 and further fabricated to prepare test samples.

Materials and reagents used in Preparation Examples, Examples and Comparative Examples disclosed herein are listed below:

diphenyldivinylsilane: as shown by Formula (I), available from Suzhou Siso New Material Co., Ltd.

phenyltrivinylsilane: as shown by Formula (II), available from Suzhou Siso New Material Co., Ltd.

SA-9000: methacrylate-terminated polyphenylene ether resin, available from Sabic. OPE-2st 2200: vinylbenzyl-terminated polyphenylene ether resin, available from Mitsubishi Gas Chemical Co., Inc.

Ricon 100: styrene-butadiene copolymer, available from Cray Valley.

B-1000: polybutadiene, available from Nippon Soda Co., Ltd.

Ricon 130: butadiene homopolymer, available from Cray Valley.

SC-2500 SXJ: spherical silica pre-treated by amino silane coupling agent, available from Admatechs.

DCP: dicumyl peroxide, available from NOF Corporation.

methyl ethyl ketone: MEK, source not limited.

toluene: available from Chambeco Group.

diphenyldimethyldivinylsiloxane: as shown by Formula (V):

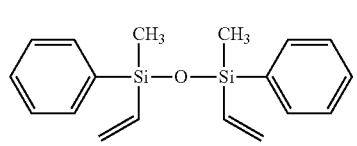

Formula (V)

RH-Vi321: vinylsiloxane, as shown by Formula (VI):

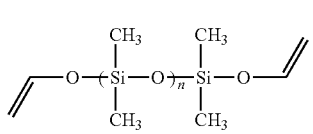

Formula (VI)

siloxane A: vinylsiloxane, as shown by Formula (VII):

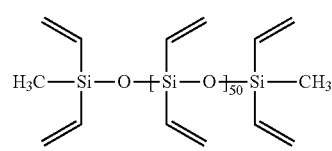

Formula (VII)

siloxane B: vinylsiloxane, as shown by Formula (VIII):

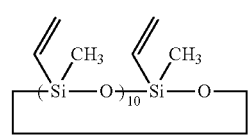

Formula (VIII)

TAIC: triallyl isocyanurate, available from Kingyorker Enterprise Co., Ltd.

KBM-1003: vinylsilane coupling agent having a structure of $(CH_3O)_3SiCH=CH_2$, available from Shin-Etsu Chemical Co., Ltd.

KBM-1403: styrylsilane coupling agent, having a structure of

available from Shin-Etsu Chemical Co., Ltd.

Compositions and test results of resin compositions of Examples and Comparative Examples are listed below (in part by weight):

TABLE 1

Resin compositions of Examples (in part by weight)

| | | E1 | E2 | E3 | E4 | E5 | E6 | E7 |
|---|---|---|---|---|---|---|---|---|
| multifunctional vinylsilane | diphenyldivinylsilane | 5 | 20 | 60 | 100 | 140 | | 60 |
| | phenyltrivinylsilane | | | | | | 60 | |
| vinyl-containing polyphenylene ether resin | SA-9000 | 100 | 100 | 100 | 100 | 100 | 100 | 100 |
| | OPE-2st 2200 | | | | | | | |
| polyolefin | Ricon 100 | | | | | | | 5 |
| | B-1000 | | | | | | | |
| | Ricon 130 | | | | | | | |

TABLE 1-continued

Resin compositions of Examples (in part by weight)

| | | E1 | E2 | E3 | E4 | E5 | E6 | E7 |
|---|---|---|---|---|---|---|---|---|
| inorganic filler | SC-2500 SXJ | 80 | 80 | 80 | 80 | 80 | 80 | 80 |
| curing accelerator | DCP | 1 | 1 | 1 | 1 | 1 | 1 | 1 |
| solvent | methyl ethyl ketone | 50 | 50 | 50 | 50 | 50 | 50 | 50 |
| | toluene | 50 | 50 | 50 | 50 | 50 | 50 | 50 |

TABLE 2

Resin compositions of Examples (in part by weight)

| | | E8 | E9 | E10 | E11 | E12 | E13 | E14 |
|---|---|---|---|---|---|---|---|---|
| multifunctional vinylsilane | diphenyldivinylsilane | 60 | 60 | 60 | 20 | 60 | 20 | 30 |
| | phenyltrivinylsilane | | | | 40 | | 40 | 30 |
| vinyl-containing polyphenylene ether resin | SA-9000 | 100 | 100 | 100 | 100 | 50 | 50 | 70 |
| | OPE-2st 2200 | | | | | 50 | 50 | 30 |
| polyolefin | Ricon 100 | 30 | | | | | | 20 |
| | B-1000 | | 30 | | | | | |
| | Ricon 130 | | | 30 | | | | |
| inorganic filler | SC-2500 SXJ | 80 | 80 | 80 | 80 | 80 | 80 | 100 |
| curing accelerator | DCP | 1 | 1 | 1 | 1 | 1 | 1 | 1.2 |
| solvent | methyl ethyl ketone | 50 | 50 | 50 | 50 | 50 | 50 | 60 |
| | toluene | 50 | 50 | 50 | 50 | 50 | 50 | 40 |

TABLE 3

Resin compositions of Comparative Examples (in part by weight)

| | | C1 | C2 | C3 | C4 | C5 | C6 | C7 | C8 | C9 | C10 |
|---|---|---|---|---|---|---|---|---|---|---|---|
| multifunctional vinylsilane | diphenyldivinylsilane | | | | | | | | | | |
| | phenyltrivinylsilane | | | | | | | | | | |
| vinyl-containing polyphenylene ether resin | SA-9000 | 100 | 100 | 100 | 100 | 100 | 100 | 100 | 100 | 100 | 100 |
| polyolefin | Ricon 100 | | | | | | 60 | 30 | | | |
| vinylsiloxane | Diphenyldimethyl divinylsiloxane (Formula (V)) | 60 | | | | | | | | | |
| | RH-Vi321 (Formula (VI)) | | 60 | | | | | | | | |
| | siloxane A (Formula (VII)) | | | 60 | | | | | | | |
| | siloxane B (Formula (VIII)) | | | | 60 | | | | | | |
| crosslinking agent | TAIC | | | | | 60 | | | | | |
| vinylsilane coupling agent | KBM-1003 | | | | | | | | | 20 | |
| styrylsilane coupling agent | KBM-1403 | | | | | | | | | | 20 |
| inorganic filler | SC-2500 SXJ | 80 | 80 | 80 | 80 | 80 | 80 | 80 | 80 | 80 | 80 |
| curing accelerator | DCP | 1 | 1 | 1 | 1 | 1 | 1 | 1 | 1 | 1 | 1 |
| solvent | methyl ethyl ketone | 50 | 50 | 50 | 50 | 50 | 50 | 50 | 50 | 50 | 50 |
| | toluene | 50 | 50 | 50 | 50 | 50 | 50 | 50 | 50 | 50 | 50 |

Preparation of Varnish

Components of the resin composition from each Example (abbreviated as E1 to E14) or Comparative Example (abbreviated as C1 to C10) were placed into a stirrer (e.g., batch mixer) according to the amounts listed in Tables 1-3 for stirring and well-mixing to form a resin varnish.

For example, in Example E1, 5 parts by weight of diphenyldivinylsilane and 100 parts by weight of methacrylate-terminated polyphenylene ether resin (SA-9000) were added to a stirrer containing 50 parts by weight of toluene and 50 parts by weight of methyl ethyl ketone, and the solution was mixed and stirred to fully dissolve the solid ingredients to form a homogeneous liquid state. Then 80 parts by weight of spherical silica (SC-2500 SXJ) were added and well dispersed, followed by adding 1 part by weight of dicumyl peroxide (DCP, pre-dissolved by a proper amount of solvent) and stirring for 0.5 hour to obtain the varnish of resin composition E1.

In addition, according to the components and amounts listed in Table 1 to Table 3 above, varnishes of Examples E2 to E14 and Comparative Examples C1 to C10 (each component having a solid content of 100%) were prepared following the preparation process of the varnish of Example E1.

On the other hand, resin compositions from Table 1 to Table 3 were used to make samples (specimens) as described below and tested under conditions specified below.

Prepreg (Using 2116 E-Glass Fiber Fabric)

Resin compositions from different Examples (E1 to E14) and Comparative Examples (C1 to C10) listed in Table 1 to Table 3 were respectively added to a stirred tank, well mixed and fully dissolved as varnishes and then added to an impregnation tank. A fiberglass fabric (e.g., 2116 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 52%).

Prepreg (Using 1080 E-Glass Fiber Fabric)

Resin compositions from different Examples (E1 to E14) and Comparative Examples (C1 to C10) listed in Table 1 to Table 3 were respectively added to a stirred tank, well mixed and fully dissolved as varnishes and then added to an impregnation tank. A fiberglass fabric (e.g., 1080 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 70%).

Prepreg (Using 1080 E-Glass Fiber Fabric)

Resin compositions from different Examples (E1 to E14) and Comparative Examples (C1 to C10) listed in Table 1 to Table 3 were respectively added to a stirred tank, well mixed and fully dissolved as varnishes and then added to an impregnation tank. A fiberglass fabric (e.g., 1080 E-glass fiber fabric) was passed through the impregnation tank to adhere the resin composition on the fiberglass fabric, followed by heating at 120° C. to 150° C. to the semi-cured state (B-Stage) to obtain the prepreg (resin content of about 73%).

Copper-Clad Laminate (Obtained by Laminating Eight Prepregs)

Two 18 μm hyper very low profile 2 copper foils (HVLP2 copper foils) and eight prepregs made from each resin composition (using 2116 E-glass fiber fabric) were prepared batchwise. Each prepreg has a resin content of about 52%. A copper foil, eight prepregs and a copper foil were superimposed in such order and then subject to a vacuum condition for lamination at 200° C. for 2 hours to form each copper-clad laminate sample. Insulation layers were formed by curing (C-stage) eight sheets of superimposed prepreg between the two copper foils, and the resin content of the insulation layers was about 52%.

Copper-Free Laminate (Obtained by Laminating Eight Prepregs)

Each copper-clad laminate was etched to remove the two copper foils to obtain a copper-free laminate made from laminating eight prepregs, and each copper-free laminate had a resin content of about 52%.

Copper-Free Laminate (Obtained by Laminating Two Prepregs)

Two 18 μm hyper very low profile 2 copper foils (HVLP2 copper foils) and two prepregs made from each resin composition (using 1080 E-glass fiber fabric) were prepared batchwise. Each prepreg has a resin content of about 70%. A copper foil, two prepregs and a copper foil were superimposed in such order and then subject to a vacuum condition for lamination at 200° C. for 2 hours to form each copper-clad laminate sample, which was then subject to an etching process to remove the two copper foils to obtain a copper-free laminate. Insulation layers were formed by curing (C-stage) two sheets of superimposed prepreg between the two copper foils, and the resin content of the insulation layers was about 70%.

Test items and test methods are described below.

1. Prepreg/Laminate Surface Appearance

Prepreg surface was observed with naked eyes. If oily precipitation on prepreg surface is observed, a designation of "oily precipitation" is given. Prepreg surface was also touched; if the prepreg was sticky to hands, a designation of "stickiness of prepreg" is given. If the prepreg was very sticky to hands, a designation of "serious stickiness of prepreg" is given.

During the preparation of the copper-clad laminate (obtained by laminating eight prepregs), a copper foil, eight prepregs and a copper foil were superimposed in such order and then subject to a vacuum condition for lamination at 200° C. for 2.5 hours to form each copper-clad laminate, which was then subject to an etching process to remove the copper foils on both sides to obtain the copper-free laminate. The surface of the insulation layer of the copper-free laminate was observed with naked eyes. If no void or branch-like pattern was observed from the surface of the copper-free laminate, a designation of "normal" is given.

Generally, it is required that the appearance of a prepreg or copper-free laminate to be normal (e.g., smooth surface). Oily precipitation on prepreg surface will cause poor properties such as peel strength of the laminate made therefrom; stickiness of prepreg means that a prepreg will stick to or adhere to another prepreg or other objects when in contact; such as when prepregs are packaged in a roll or stacked together in vacuum package, undesirable adhesion between the prepregs or between the packaging material and the prepregs may occur and affect the normal use of the prepregs.

For example, articles made from the resin composition disclosed herein are characterized by normal prepreg or laminate surface appearance, such as no oily precipitation or stickiness on the prepreg surface or no void or branch-like pattern on the insulation layer surface of a copper-free laminate.

2. Glass Transition Temperature (Tg)

A copper-free laminate (obtained by laminating eight prepregs) sample was subject to glass transition temperature measurement by using the dynamic mechanical analysis (DMA) method. Each sample was heated from 35° C. to 300° C. at a heating rate of 2° C./minute and then subject to the measurement of glass transition temperature (° C.) by reference to the method described in IPC-TM-650 2.4.24.4. The glass transition temperature of the copper-free laminate tested in the first round was recorded as Tg1. After the sample was cooled (about 35° C.), the glass transition temperature of the sample was tested again as described above. The glass transition temperature of the copper-free laminate tested in the second round was recorded as Tg2. Higher glass transition temperature is better.

For example, articles made from the resin composition disclosed herein are characterized by high glass transition temperature as measured by reference to IPC-TM-650 2.4.24.4, such as the first glass transition temperature Tg1 being greater than or equal to 181° C., the second glass transition temperature Tg2 being greater than or equal to 197° C., or such as the first glass transition temperature Tg1 being greater than or equal to 192° C., and the second glass transition temperature Tg2 being greater than or equal to 208° C.

3. Ratio of Thermal Expansion

A copper-free laminate sample (obtained by laminating eight prepregs) was subject to thermal mechanical analysis (TMA) during the measurement of ratio of thermal expansion (i.e., ratio of dimensional change). Each sample was heated from 35° C. to 265° C. at a heating rate of 10° C./minute and then subject to the measurement of dimensional change (%) between 50° C. and 260° C. in Z-axis by reference to the method described in IPC-TM-650 2.4.24.5, wherein lower dimensional change percentage is more preferred.

In general, high ratio of thermal expansion in Z-axis indicates high ratio of dimensional change, and copper-clad laminates with high ratio of dimensional change may result in reliability problems such as delamination during printed circuit board processing. In the present technical field, lower ratio of thermal expansion is more preferred, and a difference in ratio of thermal expansion of greater than or equal to 0.1% represents a significant difference.

For example, articles made from the resin composition disclosed herein are characterized by a ratio of thermal expansion as measured by reference to IPC-TM-650 2.4.24.5 of less than or equal to 2.60%, such as less than or equal to 1.90%, 1.95%, 2.00%, 2.05%, 2.10%, 2.15%, 2.20%, 2.25% or 2.30%, such as between 1.90% and 2.60% or between 2.10% and 2.30%.

4. Copper Foil Peeling Strength (Peel Strength, P/S)

A copper-containing laminate (obtained by laminating eight prepregs) was cut into a rectangular specimen with a width of 24 mm and a length of greater than 60 mm, which was then etched to remove surface copper foil and leave a rectangular copper foil with a width of 3.18 mm and a length of greater than 60 mm. The specimen was tested by using a tensile strength tester by reference to IPC-TM-650 2.4.8 at ambient temperature (about 25° C.) to measure the force (lb/in) required to pull off the copper foil from the laminate surface. A higher copper foil peeling strength is more preferred, and a difference in copper foil peeling strength of greater than or equal to 0.1 lb/in represents a significant difference.

For example, articles made from the resin composition disclosed herein are characterized by a copper foil peeling strength as measured by reference to IPC-TM-650 2.4.8 of greater than or equal to 2.30 lb/in, preferably greater than or equal to 2.95 lb/in, 3.10 lb/in, 3.15 lb/in, 3.20 lb/in, 3.25 lb/in, 3.30 lb/in, 3.35 lb/in or 3.40 lb/in, such as between 2.95 lb/in and 3.40 lb/in.

5. Thermal Resistance after Moisture Absorption (PCT)

A copper-free laminate sample (obtained by laminating eight prepregs) was subject to pressure cooking test (PCT) by reference to IPC-TM-650 2.6.16.1 and five hours of moisture absorption (testing temperature of 121° C., relative humidity of 100%), and then by reference to IPC-TM-650 2.4.23, the sample after moisture absorption was immersed into a 288° C. solder bath for 20 seconds, removed and then inspected for the absence or presence of delamination, which represents fail, such as whether interlayer delamination or blistering occurs between insulation layers. Interlayer delamination or blistering may occur between any layers of the laminate.

For example, articles made from the resin composition disclosed herein are characterized by no delamination in a thermal resistance test after moisture absorption by reference to IPC-TM-650 2.6.16.1 and IPC-TM-650 2.4.23.

6. T288 Thermal Resistance

A copper-clad laminate sample (obtained by laminating eight prepregs) was used in the T288 thermal resistance test. At a constant temperature of 288° C., a thermomechanical analyzer (TMA) was used by reference to IPC-TM-650 2.4.24.1 to test each sample and record the time to delamination (e.g., blistering) of the copper-clad laminate. If no delamination was observed after 70 minutes of testing, a designation of ">70" was given.

For example, articles made from the resin composition disclosed herein are characterized by a time to delamination as measured by using a thermomechanical analyzer by reference to IPC-TM-650 2.4.24.1 of greater than or equal to 70 minutes, such as between 70 minutes and 100 minutes.

7. Dielectric Constant (Dk) and Dissipation Factor (Df)

In the measurement of dielectric constant and dissipation factor, a copper-free laminate sample (obtained by laminating two prepregs) was tested by using a microwave dielectrometer available from AET Corp. by reference to JIS C2565 at 10 GHz for analyzing each sample. Lower dielectric constant or lower dissipation factor represents better dielectric properties of the sample.

Under a 10 GHz frequency, for a Dk value of less than or equal to 3.60 and a Df value of less than or equal to 0.005, a difference in Dk value of greater than or equal to 0.05 represents substantial difference (i.e., significant technical difficulty) in dielectric constant of different laminates, and a difference in Dk value of less than 0.05 represents no substantial difference in dielectric constant of different laminates; a difference in Df value of less than 0.0001 represents no substantial difference in dissipation factor of different laminates, and a difference in Df value of greater than or equal to 0.0001 represents a substantial difference (i.e., significant technical difficulty) in dissipation factor of different laminates.

For example, articles made from the resin composition disclosed herein are characterized by a dielectric constant of less than or equal to 3.35 such as less than or equal to 3.30 and a dissipation factor of less than or equal to 0.0036 such as less than or equal to 0.0033 as measured by reference to HS C2565 at 10 GHz.

8. Inner Resin Flow

First, an EM-827 copper-containing laminate was used as a copper-containing core (available from Elite Electronic Material (Zhongshan) Co., Ltd., using 7628 E-glass fiber fabric and 1-ounce HTE copper foil), which had a thickness of 28 mil. Then the surface copper foil of the copper-containing core was subject to a conventional brown oxidation process to obtain a brown oxide treated core.

A prepreg (using 1080 E-glass fiber fabric, resin content of about 73%, about 4.5 mil in thickness, 17 inch*15 inch in size) prepared from each Example (E1 to E14) and each Comparative Example (C1 to C10) and a brown oxide treated core (28 mil in thickness, 18 inch*16 inch in size) were prepared, wherein the center of the prepreg was a 4 inch*4 inch rhombus opening formed by using a conventional punching machine.

A piece of 0.5-ounce HTE copper foil (in reverse position, i.e., in contact with the prepreg with its smooth surface), a prepreg and a brown oxide treated core were superimposed in such order, followed by lamination and curing for 2 hours in vacuum at high temperature (200° C.) and high pressure (360 psi) to obtain a copper-containing multi-layer board. The surface copper foil of the copper-containing multi-layer board was removed to obtain a sample for inner resin flow test. Each side of the 4 inch*4 inch rhombus shape of the sample for inner resin flow test was divided into four equal sections, as illustrated in the sole FIGURE, and the resin flow (i.e., vertical distance of resin flow) of each of the twelve points from a to 1 in the sole FIGURE was measured to calculate the average of resin flow at the twelve points so as to obtain the inner resin flow (as an average) represented in mm. Generally, the inner resin flow is between 5 mm and 40 mm, preferably between 10 mm and 30 mm.

Results of the aforesaid tests of Examples and Comparative Examples are listed below.

TABLE 4

Test results of resin compositions of Examples

| Test item | Unit | E1 | E2 | E3 | E4 | E5 | E6 | E7 |
|---|---|---|---|---|---|---|---|---|
| prepreg/laminate surface appearance | — | normal | normal | normal | normal | normal | normal | normal |
| Tg | ° C. | 181/197 | 193/208 | 195/211 | 198/214 | 198/215 | 202/217 | 193/208 |
| ratio of thermal expansion | % | 2.60 | 2.30 | 2.20 | 2.10 | 1.90 | 2.12 | 2.20 |
| P/S | lb/in | 3.30 | 3.30 | 3.15 | 2.95 | 2.30 | 3.20 | 3.30 |
| PCT | — | fail | pass | pass | pass | fail | pass | pass |
| T288 | mm | >70 | >70 | >70 | >70 | >70 | >70 | >70 |
| Dk | — | 3.35 | 3.25 | 3.25 | 3.25 | 3.25 | 3.25 | 3.20 |
| Df | — | 0.0036 | 0.0033 | 0.0032 | 0.0030 | 0.0031 | 0.0033 | 0.0031 |
| inner resin flow | mm | 5 | 15 | 21 | 28 | >35 | 21 | 22 |

TABLE 5

Test results of resin compositions of Examples

| Test item | Unit | E8 | E9 | E10 | E11 | E12 | E13 | E14 |
|---|---|---|---|---|---|---|---|---|
| prepreg/laminate surface appearance | — | normal | normal | normal | normal | normal | normal | normal |
| Tg | ° C. | 192/208 | 200/215 | 193/208 | 198/213 | 200/215 | 201/216 | 200/215 |
| ratio of thermal expansion | % | 2.30 | 2.20 | 2.30 | 2.15 | 2.10 | 2.10 | 2.05 |
| P/S | lb/in | 3.40 | 3.35 | 3.40 | 3.20 | 3.10 | 3.20 | 3.40 |
| PCT | — | pass | pass | pass | pass | pass | pass | pass |
| T288 | mm | >70 | >70 | >70 | >70 | >70 | >70 | >70 |
| Dk | — | 3.20 | 3.20 | 3.30 | 3.25 | 3.25 | 3.25 | 3.20 |
| Df | — | 0.0030 | 0.0030 | 0.0030 | 0.0032 | 0.0033 | 0.0033 | 0.0030 |
| inner resin flow | mm | 24 | 26 | 25 | 21 | 22 | 22 | 23 |

TABLE 6

Test results of resin compositions of Comparative Examples

| Test item | Unit | C1 | C2 | C3 | C4 | C5 | C6 | C7 | C8 | C9 | C10 |
|---|---|---|---|---|---|---|---|---|---|---|---|
| prepreg/laminate surface appearance | — | normal | * | normal | normal | normal | ** | *** | normal | normal | normal |
| Tg | ° C. | 199/216 | 197/213 | 195/210 | 198/212 | 183/198 | 182/197 | 183/200 | 175/190 | 177/195 | 170/190 |
| ratio of thermal expansion | % | 2.50 | 2.90 | 2.60 | 2.65 | 2.30 | 3.10 | 3.00 | 3.10 | 3.00 | 3.50 |
| P/S | lb/in | 2.90 | 1.50 | 3.10 | 3.15 | 2.50 | 3.40 | 3.20 | 3.20 | 3.10 | 2.50 |
| PCT | — | pass | fail | pass | pass | fail | fail | fail | fail | fail | fail |
| T288 | mm | >70 | 10 | >70 | >70 | 20 | 50 | 50 | 10 | 11 | 15 |

TABLE 6-continued

Test results of resin compositions of Comparative Examples

| Test item | Unit | C1 | C2 | C3 | C4 | C5 | C6 | C7 | C8 | C9 | C10 |
|---|---|---|---|---|---|---|---|---|---|---|---|
| Dk | — | 3.40 | 3.50 | 3.50 | 3.50 | 3.45 | 3.15 | 3.20 | 3.50 | 3.50 | 3.50 |
| Df | — | 0.0047 | 0.0051 | 0.0048 | 0.0050 | 0.0037 | 0.0029 | 0.0031 | 0.0055 | 0.0053 | 0.0045 |
| inner resin flow | mm | 14 | 3 | 12 | 15 | 17 | 5 | 2 | 10 | 11 | 1 |

\* represents oily precipitation on prepreg surface;
\*\* represents serious stickiness of prepreg; and
\*\*\* represents stickiness of prepreg.

The following observations can be made according to the test results above.

A side-by-side comparison of Examples E3 and E6 with Comparative Examples C1 (Formula (V)), C3 (Formula (VII)) and C4 (Formula (VIII)) confirms that, by using the multifunctional vinylsilane disclosed herein, laminates thus made may achieve a better electric property and a lower Z-axis ratio of thermal expansion and, in contrast to laminates made by using vinylsiloxane, may achieve at the same time the technical effects of lowering the dielectric constant by 0.15 to 0.25, lowering the dissipation factor by 0.0014 to 0.0018, and lowering the Z-axis ratio of thermal expansion by 0.30% to 0.53%.

A comparison of Examples E3 and E6 with Comparative Example C2 (Formula (VI)) confirms that the multifunctional vinylsilane disclosed herein is compatible with the resin system so that prepregs and laminates made therefrom have normal appearance; in contrast, oily precipitation is observed from the surface of prepregs made by using vinylsiloxane with high degree of polymerization.

In addition, laminates made by using the multifunctional vinylsilane disclosed herein have low Z-axis ratio of thermal expansion, high peel strength, high thermal resistance, better dielectric properties and high inner resin flow and, in contrast to Comparative Example C2 which uses siloxane with high degree of polymerization, lower the Z-axis ratio of thermal expansion, increase the peel strength, improve the thermal resistance to a T288 of greater than 70 minutes, pass the PCT test (5 hr, dip 288° C., 20 s), lower the dielectric constant, lower the dissipation factor, increase the inner resin flow, and increase the resin flowability.

A side-by-side comparison of Examples E1 to E14 and Comparative Examples C5 to C7 confirms that, in contrast to Comparative Examples only using a vinyl compound crosslinking agent (C5) or containing only polyolefin but not containing a crosslinking agent (C6 and C7), laminates made from a resin composition containing a multifunctional vinylsilane provide at least one or more of the technical effects including having a better PCT test result, increasing the thermal resistance T288, having better prepreg/laminate surface appearance, and lowering the Z-axis ratio of thermal expansion.

A side-by-side comparison of Examples E1 to E14 with Comparative Examples C8 to C9 confirms that, in contrast to Comparative Examples only using vinyl-containing or styryl-containing silane coupling agent, laminates made according to the present disclosure provide the technical effects at the same time including significantly lowering the ratio of thermal expansion, passing the PCT test, increasing the thermal resistance T288 and greatly lowering the dissipation factor.

A side-by-side comparison of Examples E1 to E14 with Comparative Example C10 confirms that, in contrast to Comparative Example not containing a crosslinking agent or a silane coupling agent, laminates made from a resin composition containing a multifunctional vinylsilane achieve a higher glass transition temperature, a lower ratio of thermal expansion, pass the PCT test and increase the thermal resistance T288.

Comparison of all Examples E1 to E14 with all Comparative Examples C1 to C10 confirms that laminates made according to the technical solution of the present disclosure may achieve at the same time a dissipation factor of less than or equal to 0.0036 and a thermal resistance T288 of greater than 70 minutes. In contrast, Comparative Examples C1 to C10 not using the technical solution of the present disclosure fail to achieve the aforesaid technical effects.

In addition, comparison of Examples E1 and E5 with Comparative Examples C1 to C10 confirms that laminates made from other Examples (i.e., E2 to E4 and E6 to E14) can achieve at the same time one, more or all of the following technical effects: a thermal resistance T288 of greater than 70 minutes, a Z-axis ratio of thermal expansion of less than or equal to 2.30%, a copper foil peeling strength of greater than or equal to 2.90 lb/in, a dissipation factor of less than or equal to 0.0033, a dielectric constant of less than or equal to 3.30, pass in the PCT test, and glass transition temperatures Tg1 and Tg2 of respectively greater than or equal to 192° C. and 208° C. In contrast, Examples E1 and E5 and Comparative Examples C1 to C10 fail to achieve one, more or all of these technical effects.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   a vinyl-containing polyphenylene ether resin; and
   a multifunctional vinylsilane, comprising a compound of Formula (I), a compound of Formula (II) or a combination thereof:

Formula (I)

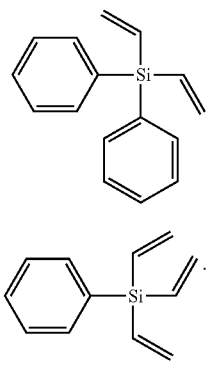

Formula (II)

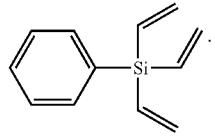

Formula (B-1)

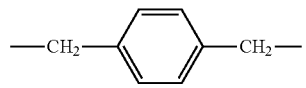

Formula (B-2)

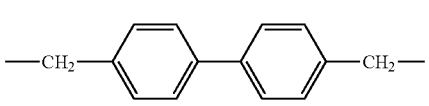

Formula (B-3)

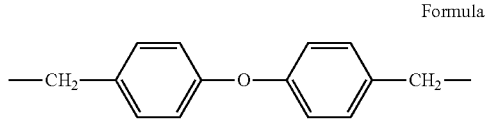

$Y_1$ and $Y_2$ independently comprise a structure of Formula (B-4):

Formula (B-4)

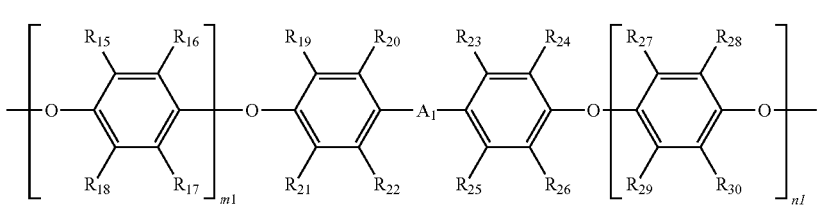

wherein $R_{15}$ to $R_{30}$ are independently H or —$CH_3$; m1 and n1 independently represent an integer of 1 to 30; and $A_1$ is selected from a covalent bond, —$CH_2$—, —CH($CH_3$)—, —C($CH_3$)$_2$—, —O—, —S—, —$SO_2$— and a carbonyl group.

2. The resin composition of claim 1, wherein the vinyl-containing polyphenylene ether resin comprises a vinylbenzyl-terminated polyphenylene ether resin, a methacrylate-terminated polyphenylene ether resin or a combination thereof.

3. The resin composition of claim 2, wherein the vinylbenzyl-terminated polyphenylene ether resin and the methacrylate-terminated polyphenylene ether resin respectively comprise a structure of Formula (III) and a structure of Formula (IV):

Formula (III)

Formula (IV)

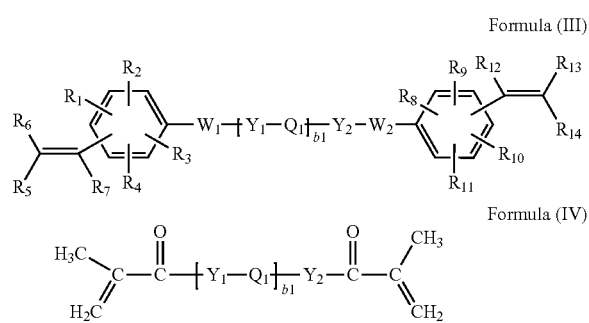

wherein $R_1$ to $R_{14}$ are individually H or —$CH_3$, and $W_1$ and $W_2$ are individually a $C_1$ to $C_3$ bivalent aliphatic group;
b1 is a natural number of 0 to 8;
$Q_1$ comprises a structure of any one of Formula (B-1) to Formula (B-3) or a combination thereof:

4. The resin composition of claim 1, further comprising a cyanate ester resin, a polyolefin resin, a small molecule vinyl compound, an acrylate resin, an epoxy resin, a phenolic resin, a benzoxazine resin, a styrene maleic anhydride resin, a polyester resin, an amine curing agent, a polyamide resin, a polyimide resin or a combination thereof.

5. The resin composition of claim 1, further comprising flame retardant, inorganic filler, curing accelerator, solvent, toughening agent, silane coupling agent or a combination thereof.

6. The resin composition of claim 1, comprising 5 to 140 parts by weight of the multifunctional vinylsilane relative to 100 parts by weight of the vinyl-containing polyphenylene ether resin.

7. The resin composition of claim 1, comprising 20 to 100 parts by weight of the multifunctional vinylsilane relative to 100 parts by weight of the vinyl-containing polyphenylene ether resin.

8. The resin composition of claim 4, comprising 5 to 30 parts by weight of the polyolefin resin relative to 100 parts by weight of the vinyl-containing polyphenylene ether resin.

9. An article made from the resin composition of claim 1, comprising a prepreg, a resin film, a laminate, or a printed circuit board.

10. The article of claim 9, having a time to delamination as measured by using a thermomechanical analyzer by reference to IPC-TM-650 2.4.24.1 of greater than or equal to 70 minutes.

11. The article of claim 9, having a dissipation factor at 10 GHz as measured by reference to HS C2565 of less than or equal to 0.0036.

12. The article of claim 9, having a ratio of thermal expansion as measured by reference to IPC-TM-650 2.4.24.5 of less than or equal to 2.60%.

13. The article of claim 9, having a copper foil peeling strength as measured by reference to IPC-TM-650 2.4.8 of greater than or equal to 2.9 lb/in.

* * * * *